United States Patent
Wu

(10) Patent No.: US 9,520,078 B2
(45) Date of Patent: Dec. 13, 2016

(54) DISPLAY DEVICE HAVING A NORMAL MODE AND AN EYE PROTECTION MODE AND METHOD FOR DRIVING SAME

(71) Applicant: Ye Xin Technology Consulting Co., Ltd., Hsinchu (TW)

(72) Inventor: I-Wei Wu, Hsinchu (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 44 days.

(21) Appl. No.: 14/521,941

(22) Filed: Oct. 23, 2014

(65) Prior Publication Data

US 2015/0161933 A1    Jun. 11, 2015

(30) Foreign Application Priority Data

Dec. 11, 2013    (TW) .............................. 102145526 A

(51) Int. Cl.
    *G09G 3/36* (2006.01)
    *G09G 3/20* (2006.01)
    *G06F 3/01* (2006.01)

(52) U.S. Cl.
    CPC ............. *G09G 3/2011* (2013.01); *G06F 3/013* (2013.01); *G09G 3/2003* (2013.01); *G09G 2320/0261* (2013.01); *G09G 2320/0666* (2013.01); *G09G 2320/08* (2013.01); *G09G 2340/12* (2013.01); *G09G 2354/00* (2013.01)

(58) Field of Classification Search
    USPC .................................................... 345/89, 690
    See application file for complete search history.

(56) References Cited

U.S. PATENT DOCUMENTS

| | | | | |
|---|---|---|---|---|
| 2005/0264702 | A1* | 12/2005 | Yoshii | G09G 3/3406 348/687 |
| 2006/0114270 | A1* | 6/2006 | Shih | G09G 3/2003 345/690 |
| 2010/0033475 | A1* | 2/2010 | Choi | G09G 3/3648 345/214 |
| 2013/0057600 | A1* | 3/2013 | Kim | G09G 3/3648 345/691 |

FOREIGN PATENT DOCUMENTS

| | | |
|---|---|---|
| CN | 101996617 A | 3/2011 |
| CN | 102044195 A | 5/2011 |
| JP | 2002-92655 A | 3/2002 |
| JP | 2007-148567 A | 6/2007 |

* cited by examiner

*Primary Examiner* — Long D Pham
(74) *Attorney, Agent, or Firm* — Zhigang Ma

(57) ABSTRACT

A display device includes a display panel, a panel driving circuit, and a control circuit. The panel driving circuit receives image data and converts the image data into output driving voltages for the display panel. The image data include original red image data, original green image data, and original blue image data. When the display device enters an eye protection mode for protecting eyes of a user, the original blue image data is modified by the panel driving circuit to reduce the gray levels of the original blue image data.

14 Claims, 6 Drawing Sheets

DISPLAY DEVICE HAVING A NORMAL MODE AND AN EYE PROTECTION MODE AND METHOD FOR DRIVING SAME

FIELD

The subject matter herein generally relates to a display device including a display panel, a panel driving circuit and a control circuit.

BACKGROUND

Display devices are widely used in consumer electronic products such as mobile phones, tablet computers and televisions. However, some users lack the consciousness of the eye protection and harm their eyes when they operate the display device for a long time.

BRIEF DESCRIPTION OF THE DRAWINGS

Implementations of the present technology will now be described, by way of example only, with reference to the attached figures.

DETAILED DESCRIPTION

Figure 1:
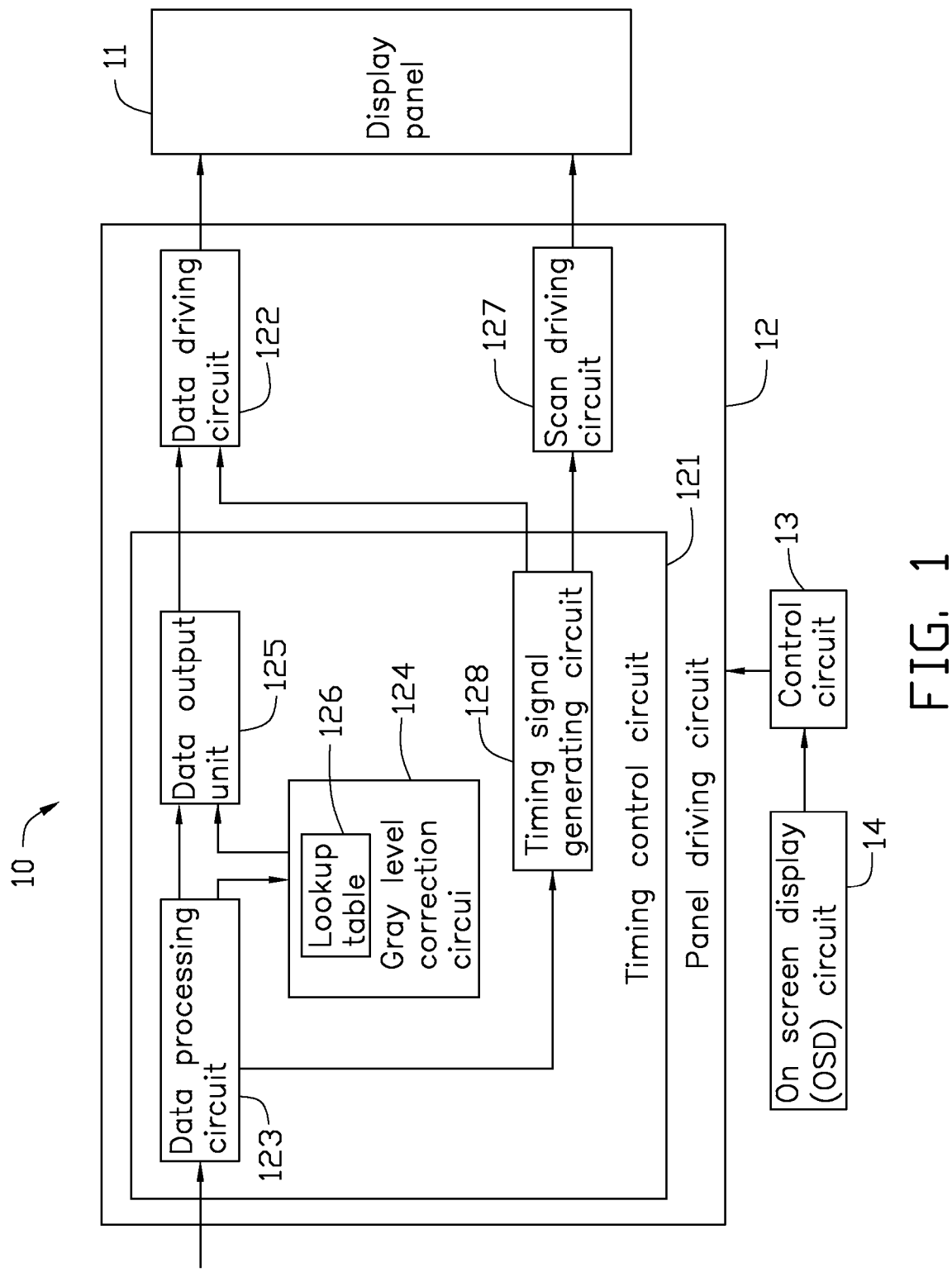
FIG. 1 is a block diagram showing a first embodiment of a display device according to the invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a display device including a display panel, a panel driving circuit and a control circuit.

FIG. 1 illustrates a block diagram showing a first embodiment of a display device 10 according to the present invention. The display device 10 includes a display panel 11, a panel driving circuit 12 and a control circuit 13. The panel driving circuit 12 receives image data, and converts the image data into output driving voltages for the display panel 11. The display panel 11 can be a liquid crystal display panel or an organic light-emitting diode display panel.

Figure 2:
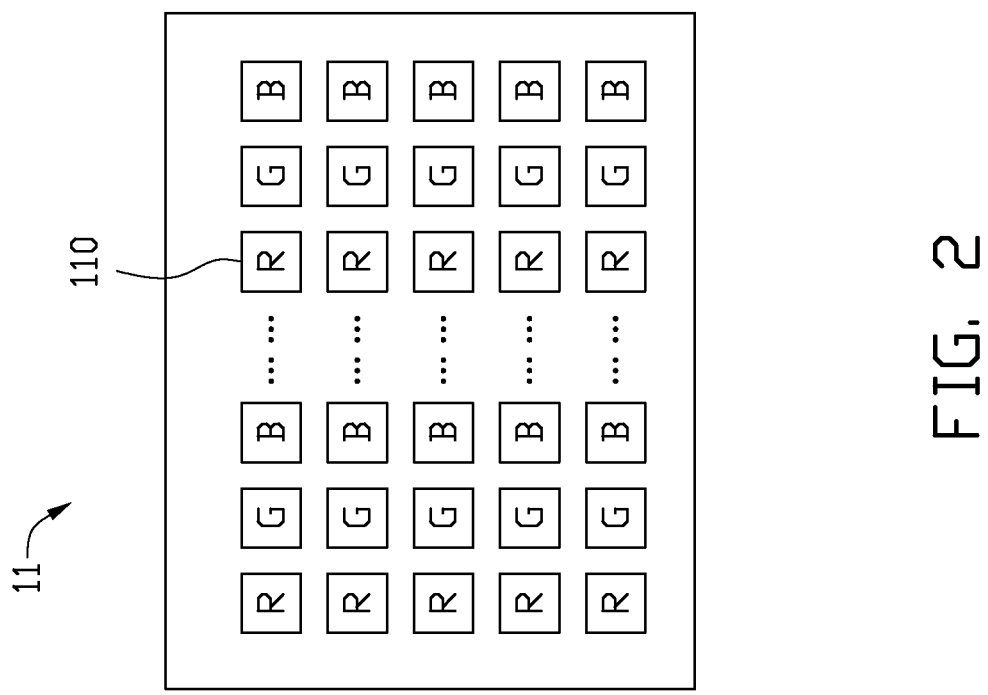
FIG. 2 is a diagrammatic view of the display panel of FIG. 1.

FIG. 2 illustrates a diagrammatic view of the display panel 11 of FIG. 1. The display panel 11 includes a plurality of pixels 110 arranged as a matrix. The plurality of pixels 110 includes red pixels R, green pixels G and blue pixels B. The image data include original red image data corresponding to red pixels R, original green image data corresponding to green pixels G, and original blue image data corresponding to blue pixels B. The control circuit 13 outputs a control signal to the panel driving circuit 12 and switches the display device 10 from a normal mode to an eye protection mode. When the display device 10 is in the eye protection mode, the original blue image data is modified by the panel driving circuit 12 to reduce the gray levels of the original blue image data.

Figure 3:
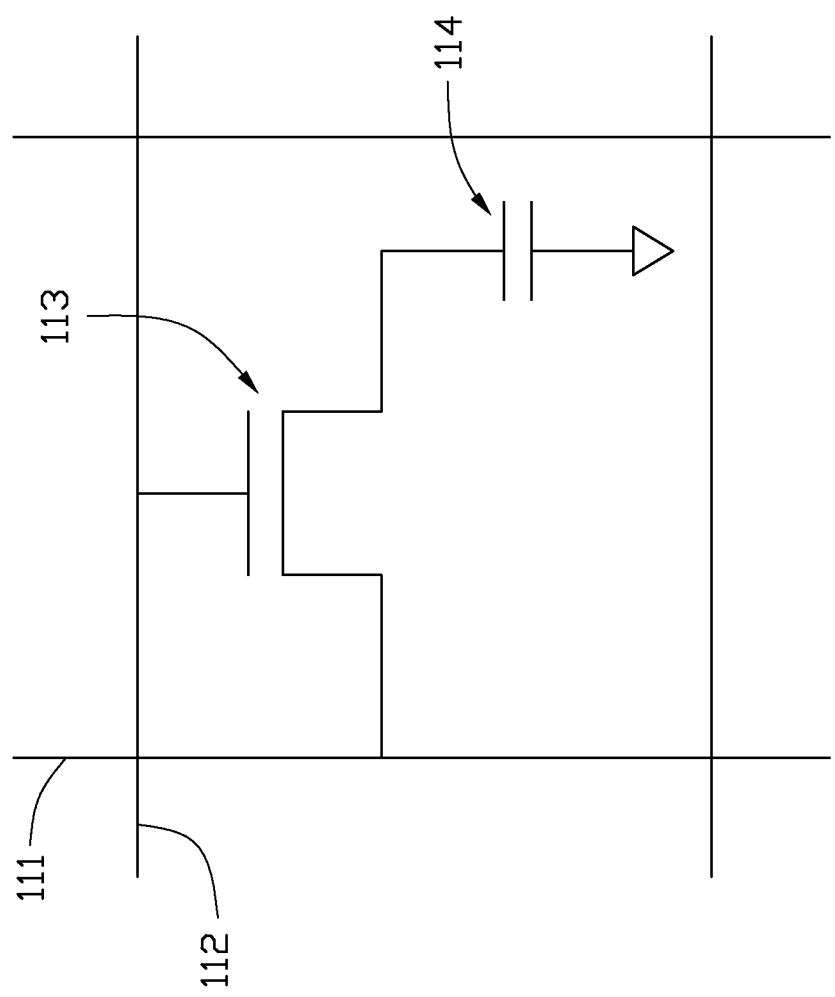
FIG. 3 is a pixel circuit diagram of a pixel of the display panel of FIG. 1.

FIG. 3 illustrates a pixel circuit diagram of a pixel 110 of the display panel 11 of FIG. 1. The pixel 110 can be a red pixel R, a green pixel G, or a blue pixel B. The red pixel R, the green pixel G, and the blue pixel B have the same pixel circuit. The display panel 11 includes data lines 111 and scan lines 112 arranged substantially perpendicular to the data lines 111. The pixel 110 is in an area defined by the adjacent two data lines 111 and the adjacent two scan lines 112. The pixel includes a thin film transistor 113 and a capacitor 114. A gate electrode of the thin film transistor 113 is connected to the scan line 112, a source electrode of the thin film transistor 113 is connected to the data line 111, and a drain electrode of the thin film transistor 113 is connected to the capacitor 114.

The panel driving circuit 12 includes a timing control circuit 121 and a data driving circuit 122. The timing control circuit 121 includes a data processing circuit 123, a gray level correction circuit 124 and a data output unit 125. The data processing circuit 123 receives the image data, and processes the image data to output the original red image data, the original green image data, the original blue image data and timing control data.

In the eye protection mode, the gray level correction circuit 124 receives the original blue image data from the data processing circuit 123, converts gray levels of the original blue image data, and outputs the corrected blue image data. The data output unit 125 receives the original red image data and the original green image data from the data processing circuit 123, receives the corrected blue image data from the gray level correction circuit 124, and outputs the original red image data, the original green image data and the corrected blue image data to the data driving circuit 122. The data driving circuit 122 generates a plurality of red pixel driving voltages, a plurality of green pixel driving voltages and a plurality of blue pixel driving voltages according to the original red image data, the original green image data and the corrected blue image data. The data driving circuit 122 outputs a plurality of red pixel driving voltages, a plurality of green pixel driving voltages and a plurality of blue pixel driving voltages to the red pixel R, the green pixel G and the blue pixel B through the data lines 111. The gray levels of the corrected blue image data have lower light intensity than the gray levels of the original blue image data, such that the average intensity of the blue light outputted from the blue pixels B of the display panel 11 are lower than that output from the blue pixels B in normal mode. Thus, the blue light output from the display panel 11 of the display device 10 is reduced, which can protect eyes of a user. For example, in a normally black LCD display, the gray level of the original blue image data is 100, and the gray level of the corrected blue pixel data is converted as 60 by the gray level correction circuit 124. Therefore, the average light intensity of the blue pixels B of the display panel 11 according to the corrected blue image data is lower than the average light intensity according to the original blue image data.

The gray level correction circuit 124 further includes a lookup table 126. The lookup table 126 includes the original blue image data and the corrected blue image data corresponding to the original blue image data. The gray level correction circuit 124 looks up the corrected blue image data in the lookup table 126 according to the original blue image data.

In the normal mode, the data output unit 125 receives the original red image data, the original green image data, and the original blue image data output from the data processing circuit 123, and outputs the original red image data, the original green image data and the original blue image data to the data driving circuit 122. The data driving circuit 122 generates a plurality of red pixel driving voltages, a plurality of green pixel driving voltages and a plurality of blue pixel driving voltages respectively according to the original red image data, the original green image data and the original blue image data. The data driving circuit 122 outputs a plurality of red pixel driving voltages, a plurality of green pixel driving voltages and a plurality of blue pixel driving voltages to the red pixels R, the green pixels G and the blue pixels B through the data lines 111. Therefore, the display panel 11 of the display device 10 displays a normal image.

The panel driving circuit 12 further includes a scan driving circuit 127. The scan driving circuit 127 outputs a scan driving signal to the scan line 112 of the display panel 11. The display panel 11 is driven by the data driving circuit 122 and the scan driving circuit 127.

The timing control circuit 121 further includes a timing signal generating circuit 128. The timing signal generating circuit 128 receives the timing control data output from the data processing circuit 123, and generates a timing control signal according to the timing control data. The timing signal generating circuit 128 outputs the timing control signal to the data driving circuit 122 and the scan driving circuit 127 to control the timing of a plurality of red pixel driving voltages, a plurality of green pixel driving voltages, and a plurality of blue pixel driving voltages output from data driving circuit 122, and the timing of the scan driving signal output from the scan driving circuit 127.

When the display device 10 is used in middle or large screen size electronic devices such as desktop monitors, laptops and televisions, the timing control circuit 121, the data driving circuit 122 and the scan driving circuit 127 can be an integrated circuit chip respectively and connects by an internal or external circuit. When the display device 10 is used in portable electronic devices such as mobile phones, tablet computers and digital cameras, the timing control circuit 121, the data driving circuit 122 and the scan driving circuit 127 can be integrated in an integrated circuit chip.

The gray level correction circuit 124 and the timing control circuit 121 can be integrated in an integrated circuit chip. In another embodiment, the gray level correction circuit 124 and the data driving circuit 122 can be integrated in an integrated circuit chip.

The display device 10 further includes an on screen display (OSD) circuit 14. The OSD circuit 14 generates a first mode switch signal or a second mode switch signal according to an operation of a user, and outputs the first mode switch signal or the second mode switch signal to the control circuit 13. The control circuit 13 outputs a first control signal or a second control signal to the panel driving circuit 12 according to the first mode switch signal or the second mode switch signal to control the display device 10 to switch between the eye protection mode and the normal mode.

A mode switch menu including options of the eye protection mode and the normal mode is provided to a user by the OSD circuit 14. The user can operate the mode switch menu. When the user selects the option of the eye protection mode, the OSD circuit 14 generates the first mode switch signal. The control circuit 13 receives the first mode switch signal and outputs the first control signal to the panel driving circuit 12 according to the first mode switch signal such that the display device 10 enters the eye protection mode. When the user selects the option of the normal mode, the OSD circuit 14 generates the second mode switch signal. The control circuit 13 receives the second mode switch signal and outputs the second control signal to the panel driving circuit 12 according to the second mode switch signal such that the display device 10 enters the normal mode.

The frequency of the blue light is higher such that the blue light is harmful to eyes of a user. The display device 10 reduces the gray levels of the original blue image data to decrease the output amounts of the blue light in the eye protection mode such that the eyes of a user can be protected.

The display device 10 can enter the eye protection mode according to the operation of a user. Especially an adult user can operate the display device 10 to enter the eye protection mode in advance, and then give the display device 10 to an underage user such that eyes of the underage user can be protected.

Figure 4:
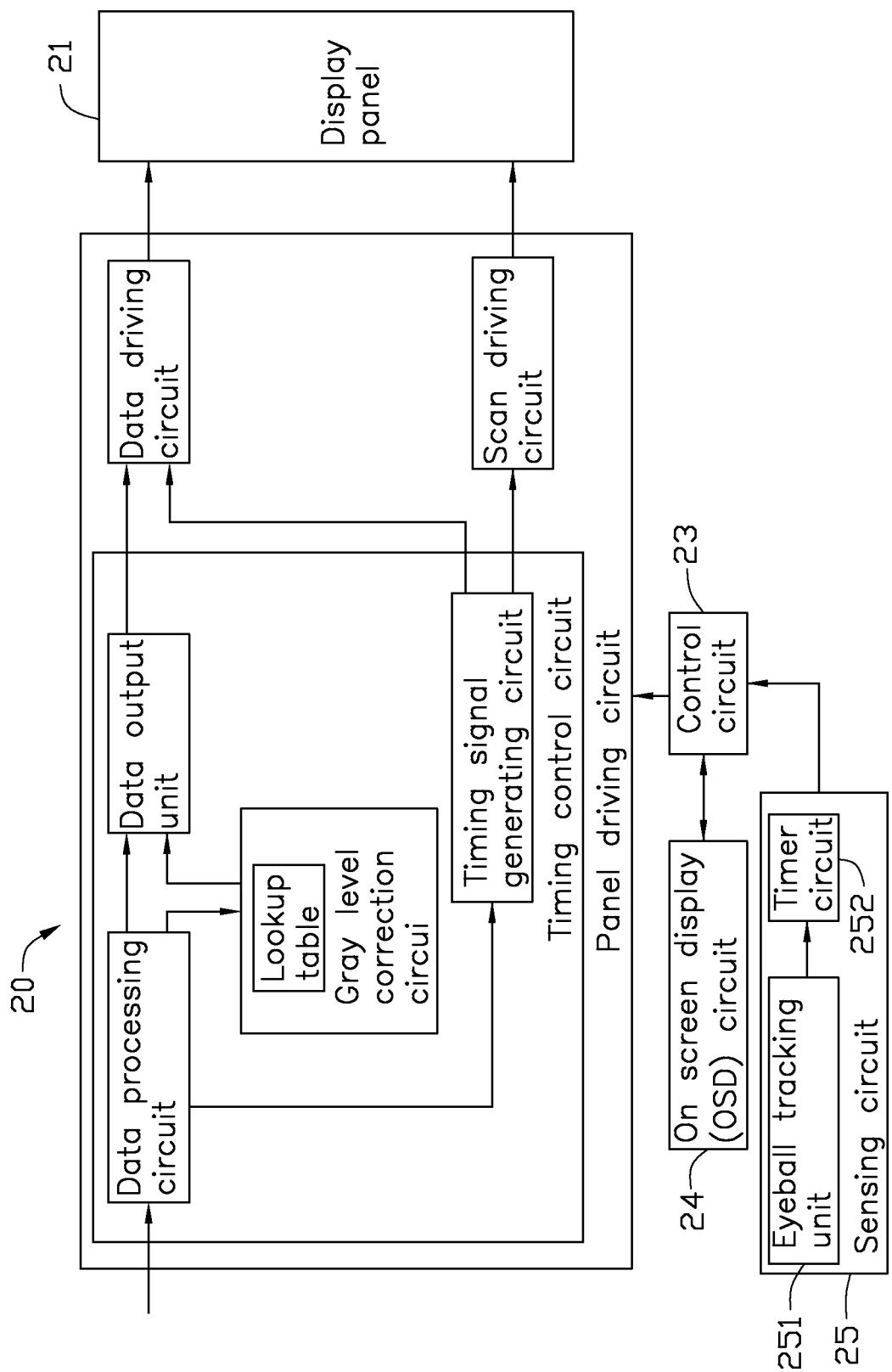
FIG. 4 is a block diagram showing a second embodiment of a display device according to the invention.

FIG. 4 illustrates a block diagram showing a second embodiment of a display device 20 according to the present invention. The display device 20 is similar to the display device 10 but the display device 20 further includes a sensing circuit 25. The sensing circuit 25 senses a used time of the display device 20 when a user uses the display device 20. The control circuit 23 of the display device 20 controls the display panel 21 to provide a mode switch menu to the user and remind the user if the display device 20 enters the eye protection mode when the used time of the display device 20 is over a determined time. The OSD circuit 24 generates a first mode switch signal according to an operation of the mode switch menu such that the control circuit 23 switches the display device 20 to enter the eye protection mode. The determined time can be set such as one hour according to the demand of the user.

The sensing circuit 25 further includes an eyeball tracking unit 251 and a timer circuit 252. The eyeball tracking unit 251 tracks an eyeball of a user and outputs a tracking signal. The timer circuit 252 calculates the used time of the display device 20 according to the tracking signal.

Figure 5:
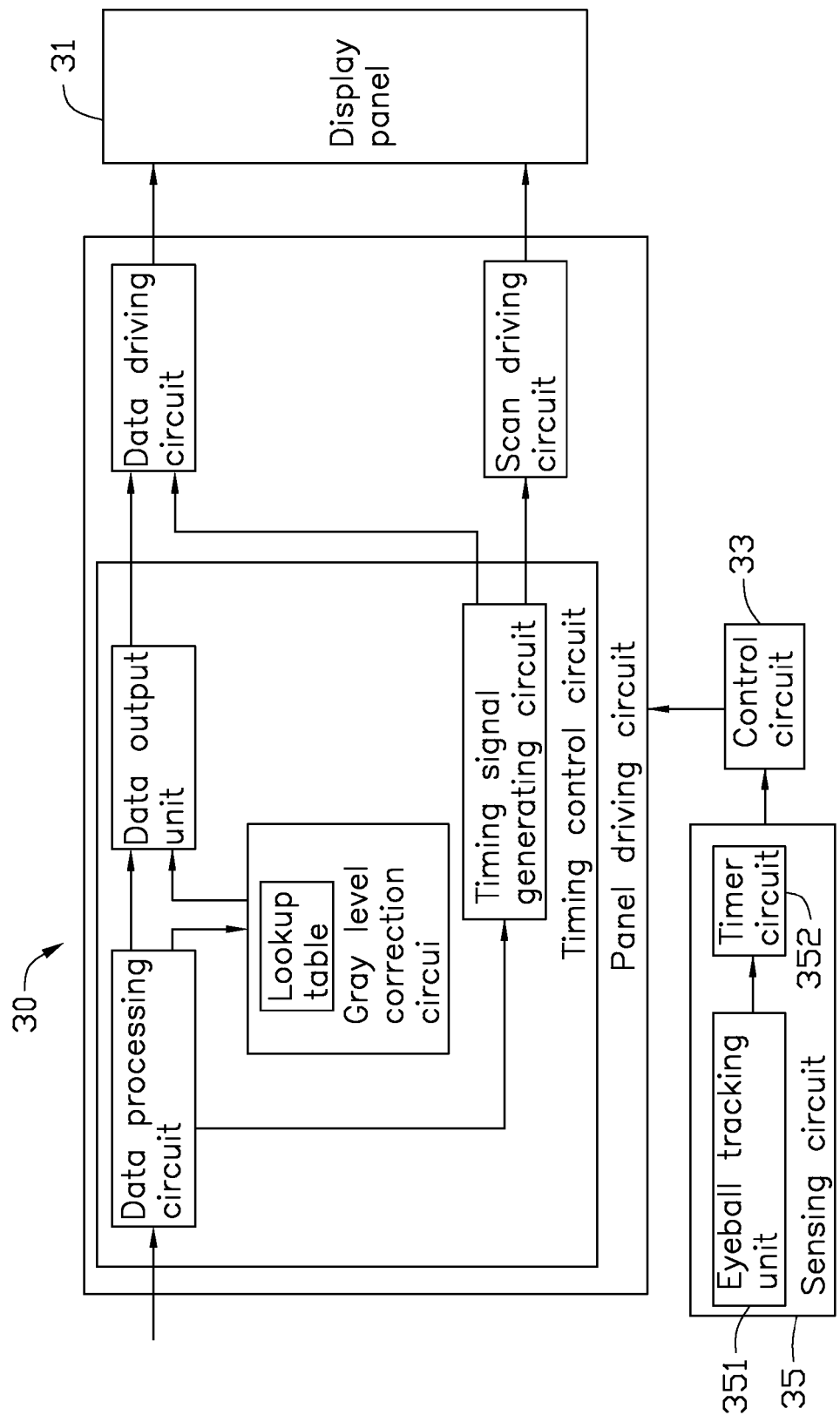
FIG. 5 is a block diagram showing a third embodiment of a display device according to the invention.

FIG. 5 illustrates a block diagram showing a third embodiment of a display device according to the present invention. The display device 30 is similar to the display device 10 but the display device 30 includes a sensing circuit 35. The sensing circuit 35 senses a used time of the display device 30 when a user uses the display device 30. When the used time of the display device is over a determined time, the control circuit 33 of the display device 30 outputs the first control signal to control the display device 30 to enter the eye protection mode. The sensing circuit 35 further includes an eyeball tracking unit 351 and a timer circuit 352. The eyeball tracking unit 351 tracks an eyeball of a user and outputs a tracking signal. The timer circuit 352 calculates the used time of the display device 30 according to the tracking signal. The determined time can be set such as one hour according to the demand of the user.

Figure 6:
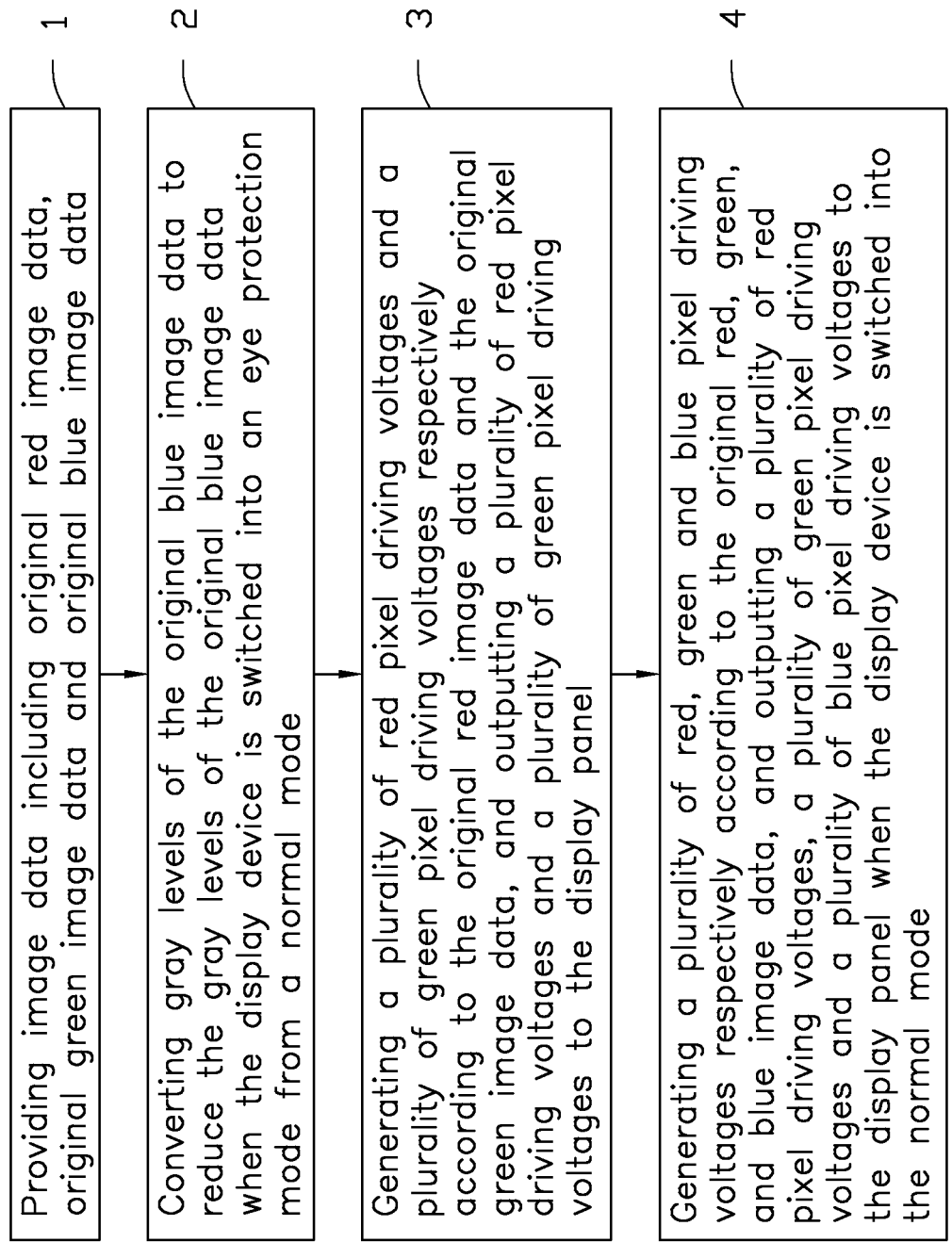
FIG. 6 is a flowchart illustrating a driving method of a display device according to the present invention.

Referring to FIG. 6, a flowchart illustrating a driving method of a display device is presented in accordance with an example embodiment which is being thus illustrated. The driving method is provided by way of example, as there are a variety of ways to carry out the method. The driving method described below can be carried out using the configurations illustrated in FIGS. 1, 4 and 5, for example, and various elements of these figures are referenced in explaining the driving method. Each block shown in FIG. 6 represents one or more processes, methods or subroutines, carried out in the driving method. Additionally, the illustrated order of blocks is by example only and the order of the blocks can change according to the present disclosure. The driving method of the display device includes the following steps (1~4).

In block 1, image data including original red image data, original green image data and original blue image data are provided.

In block 2, when the display device is switched into an eye protection mode from a normal mode, gray levels of the original blue image data are converted to reduce the gray levels of the original blue image data such that gray levels of blue light output from the display device are lower than the gray levels of the original blue image data.

Block 2 further includes the following steps. The gray levels of the original blue image data are converted to corrected blue image data. A plurality of blue pixel driving voltages are generated according to the corrected blue image data, and output to a display panel. Gray levels of the corrected blue image data are lower than the gray levels of the original blue image data such that gray levels and the average intensity of blue light output from the display device are lower than the gray levels and the average intensity of blue light of the display device driven by the original blue image data when the display device is in an eye protection mode. In block 2, the display device further includes a lookup table. The lookup table includes the original blue image data and the corrected blue image data corresponding to the original blue image data. The corrected blue image data in the lookup table are looked up according to the original blue image data such that the gray levels of the original blue image data are converted to generate the corrected blue image data.

In block 3, when the display device is in the eye protection mode, a plurality of red pixel driving voltages and a plurality of green pixel driving voltages are generated respectively according to the original red image data and the original green image data. A plurality of red pixel driving voltages and a plurality of green pixel driving voltages are output to the display panel.

In block 4, when the display device is in the normal mode, a plurality of red, green and blue pixel driving voltages are generated respectively according to the original red, green, and blue image data. A plurality of red pixel driving voltages, a plurality of green pixel driving voltages and a plurality of blue pixel driving voltages are output to the display panel.

In another embodiment, the driving method further includes the following steps. A mode switch menu is provided to a user. A first mode switch signal is generated according to an operation of the mode switch menu. The display device is switched from the normal mode to the eye protection mode according to the first mode switch signal. A used time of the display device is sensed. The mode switch menu is provided when the used time of the display device is over a determined time. An eyeball of the user is tracked to generate a tracking signal. The used time of the display device is calculated according to the tracking signal.

The embodiments shown and described above are only examples. Many details are often found in the art such as the other features of a display device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

While the above description has been by way of examples and in terms of preferred embodiments, it is to be understood that the invention is not limited thereto. To the contrary, the above description is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:
   a display panel having a plurality of red pixels, green pixels, and blue pixels;
   a panel driving circuit including a gray level correction circuit and a data driving circuit, the panel driving circuit receiving image data including original red image data corresponding to the red pixels, original green image data corresponding to the green pixels, and original blue image data corresponding to the blue pixels, and converting the image data into output driving voltages for the display panel;
   a control circuit outputting a first control signal to the panel driving circuit to switch the display device from a normal mode to an eye protection mode;
   wherein the original blue image data is modified by the gray level correction circuit, and a plurality of blue pixel driving voltages are provided to the blue pixel by the data driving circuit according to the corrected blue image data when the display device is in the eye protection mode; and
   wherein the gray levels of the blue pixels driven according to the corrected blue image data in the eye protection mode are lower than the gray levels of the blue pixels driven according to the original blue image data;
   wherein the display device further comprises a sensing circuit sensing a used time of the display device, and when the used time of the display device is over a determined time, the control circuit outputs the first control signal; and wherein the sensing circuit comprises an eyeball tracking unit outputting a tracking signal and a timer circuit calculating the used time of the display device according to the tracking signal.

2. The display device of claim 1, wherein the gray level correction circuit further comprises a lookup table regarding to the original blue image data and the corresponding corrected blue image data.

3. The display device of claim 1, wherein the driving voltages respectively for the red, green and blue pixel are provided by the data driving circuit according to the original red image data, the original green image data, and the original blue image data when the display device is in the normal mode.

4. The display device of claim 1, wherein the panel driving circuit further comprises:

a timing control circuit with the gray level correction circuit, a data processing circuit and a data output unit;

wherein the data processing circuit receives the image data, outputs the original red image data, the original green image data and the original blue image data to the data driving circuit through the data output unit when the display device is in the normal mode;

wherein when the display device is in the eye protection mode, the data processing circuit receives the image data, outputs the original red image data and the original green image data to the data output unit, and outputs the original blue image data to the gray level correction circuit, the gray level correction circuit outputs the corrected blue image data to the data output unit, and the data output unit outputs the original red image data, the original green image data and the corrected blue image data to the data driving circuit.

5. The display device of claim 4, wherein the image data further comprise timing control data, and the timing control circuit further comprises:

a timing signal generating circuit receiving the timing control data output from the data processing circuit, generating a first timing control signal according to the timing control data, and outputting the first timing control signal to the data driving circuit.

6. The display device of claim 5, wherein the panel driving circuit further comprises:

a scan driving circuit receiving a second timing control signal output from the timing signal generating circuit, and outputting a scan driving signal to the display panel.

7. The display device of claim 1, wherein the control circuit outputs a second control signal to the panel driving circuit to control the display device to enter the normal mode from the eye protection mode.

8. The display device of claim 1, wherein the display device further comprises:

an on screen display circuit generating a first mode switch signal, and outputs the first mode switch signal to the control circuit outputting the first control signal according to the first mode switch signal.

9. The display device of claim 8, wherein the display device further comprises:

a sensing circuit sensing a used time of the display device, and when the used time of the display device is over a determined time, the display device provides a mode switch menu, and the on screen display circuit generates the first mode switch signal according to an operation of the mode switch menu.

10. A display device, comprising:

a display panel comprising a plurality of red pixels, green pixels, and blue pixels;

a panel driving circuit receiving image data including original red image data corresponding to the red pixels, original green image data corresponding to the green pixels, and original blue image data corresponding to the blue pixels, and converting the image data into output driving voltages for the display panel; and a control circuit outputting a control signal to the panel driving circuit to switch the display device from a normal mode to an eye protection mode;

wherein the average light intensity of the blue pixels driven according to the corrected blue image data are lower than the average light intensity of the blue pixels driven according to the original blue image data when the display device enters the eye protection mode;

wherein the panel driving circuit further comprises:

a timing control circuit with the gray level correction circuit, a data processing circuit and a data output unit;

wherein the data processing circuit receives the image data, outputs the original red image data, the original green image data and the original blue image data to the data driving circuit through the data output unit when the display device is in the normal mode; and wherein when the display device is in the eye protection mode, the data processing circuit receives the image data, outputs the original red image data and the original green image data to the data output unit, and outputs the original blue image data to the gray level correction circuit, the gray level correction circuit outputs the corrected blue image data to the data output unit, and the data output unit outputs the original red image data, the original green image data and the corrected blue image data to the data driving circuit.

11. A method for driving a display device, the method comprising:

providing image data comprising original red image data, original green image data and original blue image data;

converting gray levels of the original blue image data to corrected blue image data, by which to generate a plurality of blue pixel driving voltages for the blue pixel to the display panel when the display device is switched into an eye protection mode from a normal mode, wherein gray levels of the corrected blue image data are lower than the gray levels of the original blue image data such that gray levels of blue light output from the display device are lower than the gray levels of the original blue image data;

providing a mode switch menu;

generating a first mode switch signal according to an operation of the mode switch menu;

controlling the display device to enter the eye protection mode from the normal mode according to the first mode switch signal;

sensing a used time of the display device;

providing the mode switch menu when the used time of the display device is over a determined time;

tracking an eyeball of a user to generate a tracking signal; and calculating the used time of the display device according to the tracking signal.

12. The method of claim 11, wherein the display device further comprises a lookup table comprising the original blue image data and the corrected blue image data corresponding to the original blue image data, the step of correcting the gray levels of the original blue image data to generate the corrected blue image data comprising:

looking up the corrected blue image data in the lookup table according to the original blue image data.

13. The method of claim 11, further comprising:

generating a plurality of red pixel driving voltages and a plurality of green pixel driving voltages respectively according to the original red and green image data, outputting the red and green pixel driving voltages to the display panel when the display device is in the eye protection mode.

14. The method of claim 11, further comprising:

when the display device is in the normal mode, generating red, green and blue pixel driving voltages respectively according to the original red, green, and blue image data, and outputting the red, green and blue pixel driving voltages to the display panel.

\* \* \* \* \*